United States Patent [19]

Fort et al.

[11] 4,042,905
[45] Aug. 16, 1977

[54] DATA ACQUISITION, TRANSPORT AND STORAGE SYSTEM

[75] Inventors: J. Robert Fort; James A. Westphal, both of Altadena; C. Hewitt Dix, Pasadena, all of Calif.

[73] Assignee: Geophysical Systems Corporation, Pasadena, Calif.

[21] Appl. No.: 626,129

[22] Filed: Oct. 28, 1975

Related U.S. Application Data

[63] Continuation-in-part of Ser. No. 358,077, May 7, 1973.

[51] Int. Cl.² .................................................. G01V 1/22
[52] U.S. Cl. .................... 340/15.5 DP; 340/15.5 CP; 235/152; 364/900
[58] Field of Search ....... 340/7 R, 15.5 CP, 15.5 DP, 340/18 CM, 155, 172.5; 325/308, 309; 346/33 C; 360/8, 18, 32, 43; 179/15 AW; 235/151.3, 152

[56] References Cited

U.S. PATENT DOCUMENTS

| | | | |
|---|---|---|---|
| 2,920,306 | 1/1960 | Feagin et al. | 235/181 |
| 3,657,694 | 4/1972 | Lindsey | 340/18 CM |
| 3,748,638 | 7/1973 | Montgomery et al. | 340/15.5 DP |
| 3,806,864 | 4/1974 | Broding et al. | 340/15.5 DP |
| 3,883,725 | 5/1975 | Fort et al. | 235/151.3 |
| 3,930,145 | 12/1975 | Fort et al. | 235/151.3 |

*Primary Examiner*—Nelson Moskowitz
*Attorney, Agent, or Firm*—Daniel Silverman

[57] ABSTRACT

This abstract describes a system for the field recording of seismic data in which a plurality of geophone outputs are connected to an array terminal. Each geophone is connected to a fixed gain differential amplifier of high gain. The outputs of the amplifiers are square wave and each output goes to one of the parallel inputs of a parallel to serial convertor, through gate means. On a first command from an array controller in a distant recording truck, the gate means are momentarily opened, to store a single bit in each channel corresponding to the sign of the square wave, in the convertor inside the array terminal. The convertor then reads out as a train of serial bits, the stored pulses. This train of single bit signals is carried to the array controller through each of the other array terminals by a single pair of conductors, and stored on a magnetic recording means.

20 Claims, 6 Drawing Figures

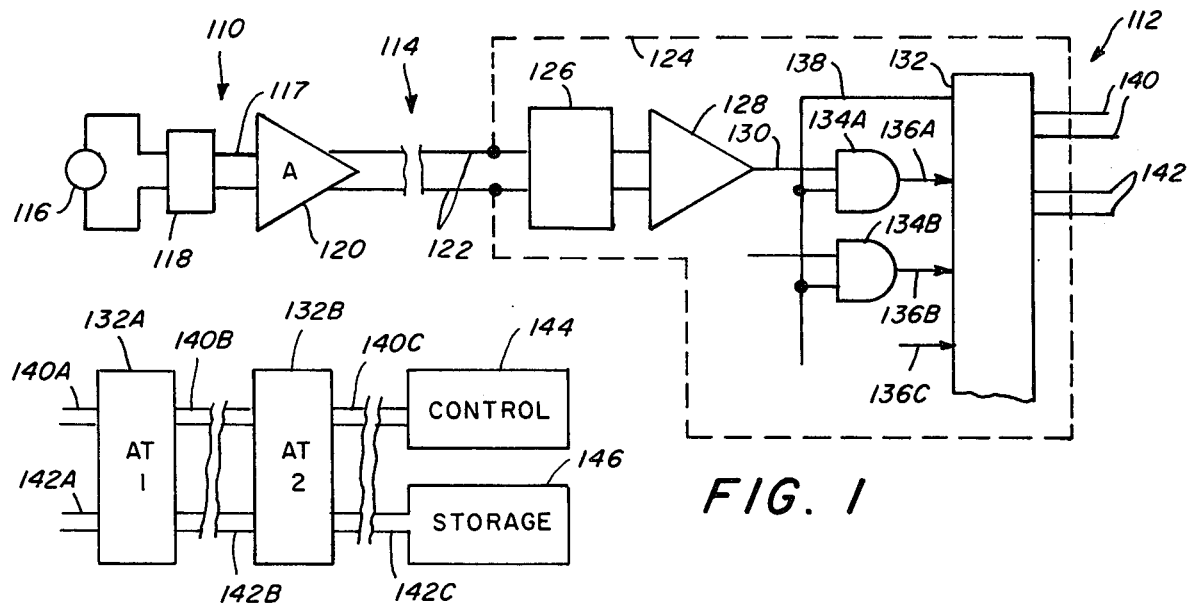
FIG. 1
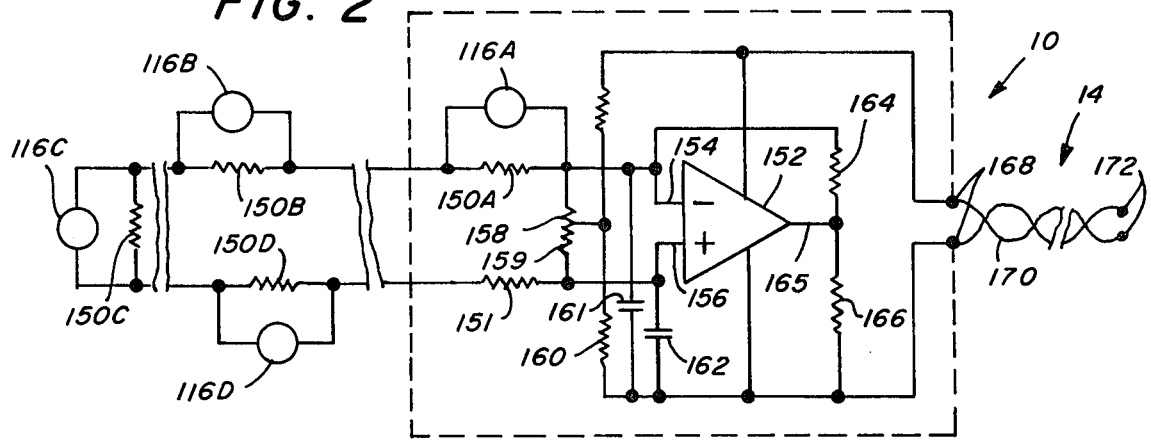
FIG. 2
FIG. 3
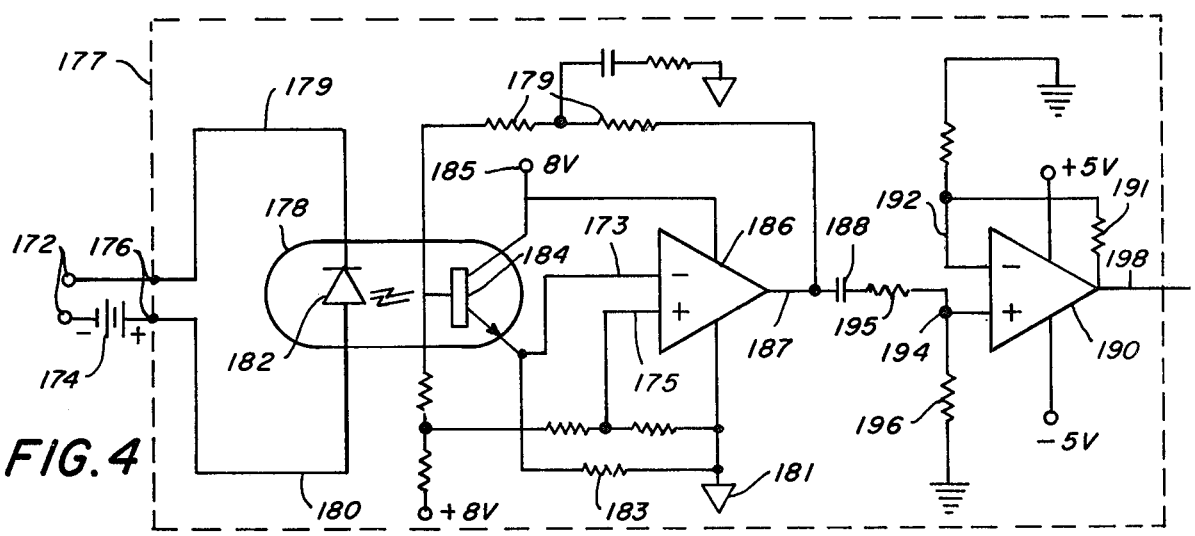
FIG. 4

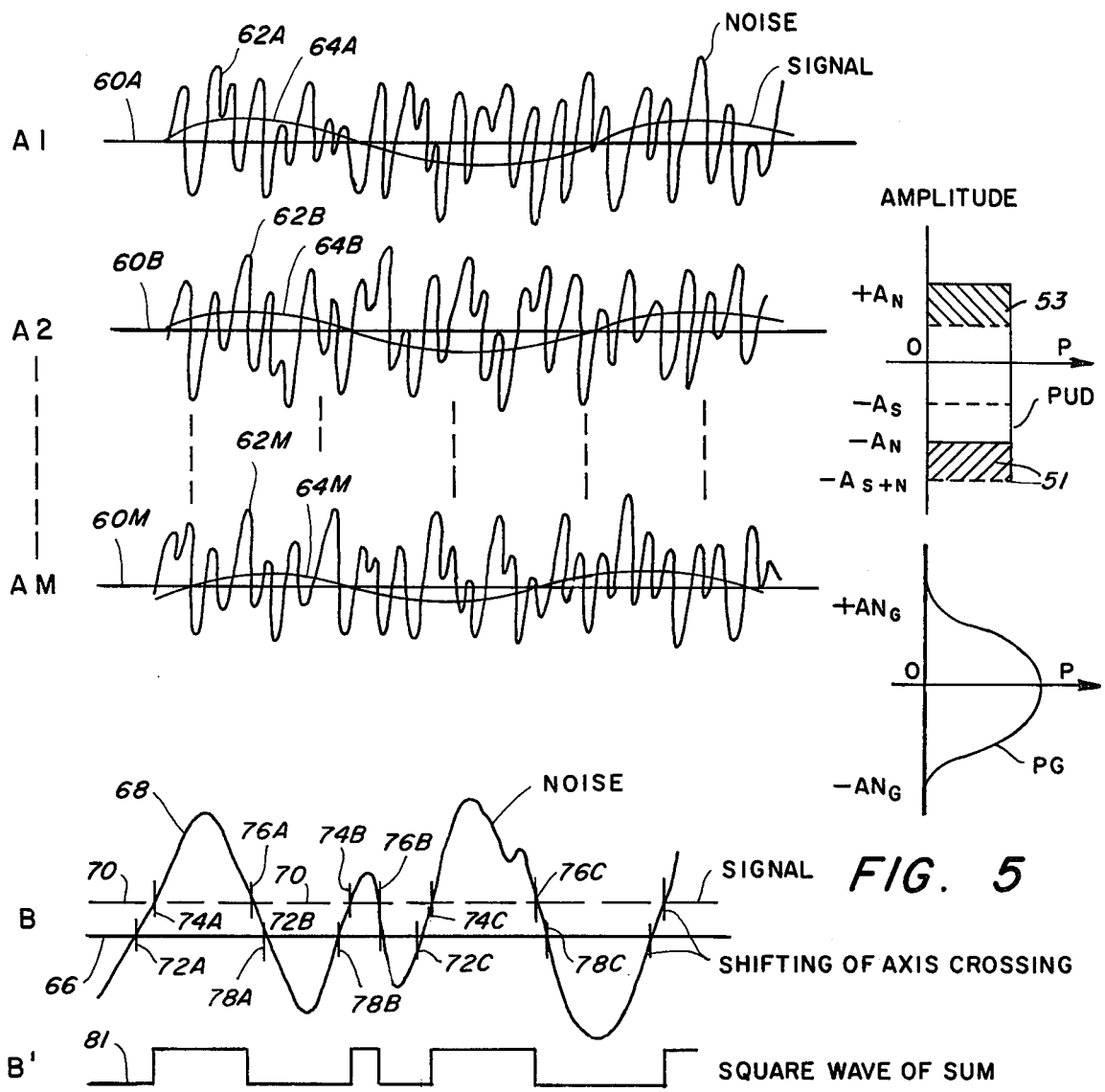
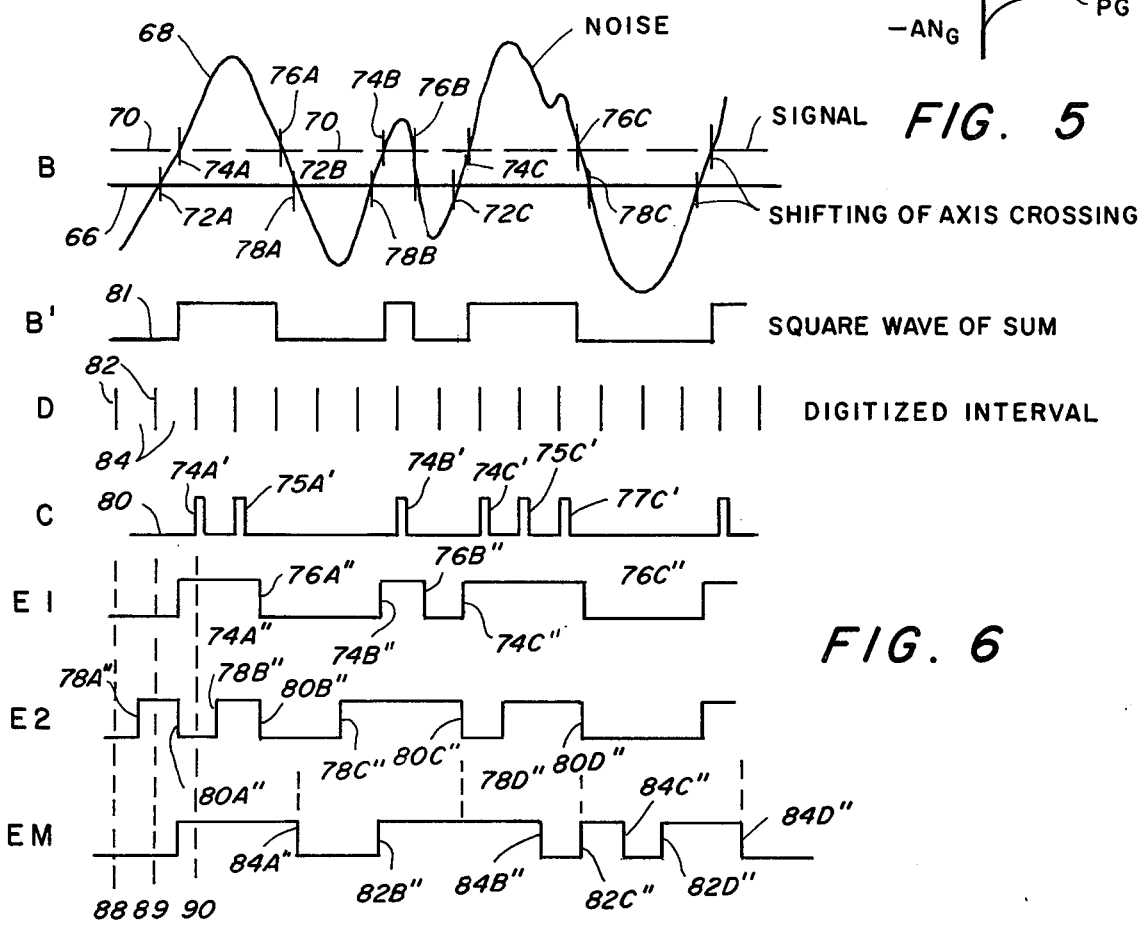
FIG. 5
FIG. 6

DATA ACQUISITION, TRANSPORT AND STORAGE SYSTEM

CROSS-REFERENCE TO RELATED APPLICATIONS

This application is a continuation-in-part of our copending application, Ser. No. 358,077 filed May 7, 1973, entitled Data Acquisition, Transport and Storage System, now U.S. Pat. No. 4,001,768. This application is also related to three other applications assigned to the same assignee as this application Ser. No. 358,097, Data Array Network System, now U.S. Pat. No. 3,881,166; Ser. No. 358,078 Data Compositing And Array Control System, now U.S. Pat. No. 3,883,725; and Ser. No. 358,076 Data Acquisition And Processing System. Application Ser. No. 358,077 is incorporated by reference into this application.

BACKGROUND OF THE INVENTION

This invention is in the field of data acquisition systems. More particularly, it is concerned with apparatus and methods for detecting analog signals at widely spaced locations, digitizing these signals and transmitting them as trains of digital pulses over a single pair of conductors to a distant recording point. Still more particularly, it concerns a system in which a plurality of separate detectors produce analog signals which are amplified, digitized and transmitted by a two conductor cable to a distant recording means.

While this invention is useful in the acquisition of any type of analog signals such as in the field of data collection, vibration analysis, sonar signaling, nuclear technology, and so on, it is most appropriately useful in the area of seismic prospecting, and as a matter of convenience will be described in that application.

In the prior art of the seismic method, it has been customary to use a large plurality of separate groups of geophones each connected by a two conductor cable which carry the geophone signals to a distant recording truck. Here each of the separate signals from each of the separate pairs of conductors is separately amplified, controlled, multiplexed and converted from analog to digital form for storage on a magnetic medium. As the number of geophones and separate recording channels have increased, in order to provide greater surface coverage, and to speed and improve the data collection, the cost and complexity of the cables, amplifying system, etc. have become prohibitive.

SUMMARY OF THE INVENTION

It is an important object of this invention to provide a multiple channel recording system in which a plurality of geophones are connected separately to an apparatus which amplifies the analog signal, which is then digitized to 1 bit to produce short pulses representing the instantaneous polarity of the analog signal. The pulses from a plurality of geophones are stored in a parallel to serial convertor and read out on command at each of the digitizing intervals.

It is a further object of this invention to process and transmit to the recording truck all of the digital signals derived from the geophone signals, as single bit digital trains, in such a form that the variable amplitude geophone signals can be recovered, without the need for the multiplicity of high gain, gain ranging, amplifiers previously and currently used in the art.

In our copending application, each geophone signal was added to a gaussian noise of selected amplitude to form a sum signal, which was then digitized to 1 bit. While such gaussian noise is required, we have found that in all geological areas in which we have made measurements, the normal geophone signal has enough ground noise of a suitable nature, so that no extra noise is required to be added. This is particularly true where the source of the seismic wave in the earth is a "low energy" source, such as a vibrator or a Dynoseis source, weight drop source, etc.

These and other objects are realized and the limitations of the prior art are overcome in this invention by providing in the field, a plurality of N array terminals. Each of these array terminals has cable conductors for a plurality of M geophones, to which they are connected. Each of the geophone signals is amplified in a fixed gain, high gain, differential amplifier which goes to a comparator amplifier. On command from the recording truck, the comparator amplifier output in the form of a square wave is digitized to 1 bit, which is representative of the instantaneous polarity or sign of the geophone signal at the time of digitization.

In each array terminal the M separate channels have their pulses stored in parallel, in a parallel to serial convertor. At digitizing intervals, on command from the recording truck, the parallel to serial convertors are unloaded in the form of serial trains of single bit pulses. The successive array terminals, which are connected in series, send out their short trains one after the other, through series array terminals over a two conductor cable to the recording truck. These first trains of pulses represent the instantaneous value of each of the M times N (MN) channels at the first digitizing interval. At each succeeding digitizing interval this process is repeated until the entire record of NM channels is recorded in the form of single bit pulse signals.

In the recording truck these pulse trains are loaded into a core memory, and then recorded on a magnetic disc. The rotating disc provides the control pulses from which the load commands are generated, and provides the clock pulses for loading onto the disc. These first trains are stored in a plurality of positions which are spaced apart in a selected manner on the multiple tracks of the disc. At the next digitizing interval a second plurality of short trains of bits is transmitted to and stored on the disc. In the same manner, up to 8,000 repetitions of digitizing and storing can be carried out to provide a first record in storage.

Next a repetition of the initiating seismic wave signal is made and the geophone signals are gathered and processed in a similar manner to provide a second set of trains of single bit pulses which are transmitted to the disc. At each digitizing interval, the first record of single bit pulses is read out of the disc into memory as the second record samples of new data are read into memory. These two sets of samples are then added and restored on the disc. When all of the up to 8,000 digitized samples in each record are added, the sum of the two records, which is a "stacked" record, is now stored on the disc. In this way a great many records, each obtained from a repetition of the source, are composited, or stacked, on the disc. This process of storing and adding, (compositing) (stacking) the records is fully described in the copending application Ser. No. 358,078, now U.S. Pat. No. 3,883,725, which is entered into this application by reference.

In the recording process, the geophone signals are recorded along with naturally occurring ground noise, which is a random noises of variable amplitude. On successive repetitions of the source these records are effectively added, or composited, or stacked. This stacking of repetitive records provides a means of reducing the magnitude of the random noise with respect to the signal, and recovering the signal.

Since it is substantially impossible to transmit, in real time, at short digitizing intervals, a very large plurality of geophone signals digitized to 15 to 16 bits, transmitted over a two conductor cable, it is necessary to code the geophone signals in such a way that they can be transmitted as a single bit signal, while retaining their essential amplitude information, for later recovery.

By working with naturally occurring noisy geophone signals, a random variation in axis-crossing times of the geophone signal plus noise are provided in accordance with the magnitude of the geophone signal and its polarity. This shift in the axis-crossing times of the sum of signal plus noise, is the method of carrying the amplitude information of the signal to the recording truck. This information is coded at the array terminal by the comparator amplifier, in the form of a single bit for each channel, for each digitizing interval. Thus at each digitizing interval all that has to be transmitted to the truck are a series of bits equal in number (NM) to the total number of channels.

After these single bit trains are received and recorded for all digitizing intervals, the sweep is repeated, and a second record is recorded and composited with the first record. After many repeated sweeps have been composited, the amplitude variation of the original geophone signal will be substantially recovered.

BRIEF DESCRIPTION OF THE DRAWINGS

These and other objects of this invention and a better understanding of the principles and details of the invention will be evident from the following description taken in conjunction with the appended drawings in which:

FIG. 1 illustrates in schematic form, the circuit diagram for a single channel of the recording system of this invention.

FIG. 2 illustrates the series connection of the array terminals.

FIGS. 3 and 4 provide additional details of FIG. 1.

FIG. 5 illustrates the probability representation of the noise that is recorded with the geophone signal.

FIG. 6 illustrate how the signals including their noise are converted to square waves, and are digitized, and what the digitized train of single bit signals looks like.

DESCRIPTION OF THE PREFERRED EMBODIMENT

This invention is applicable to the acquisition, transport and storage of many kinds of analog signals. It is most useful however, where signals are to be acquired at a large multiplicity of spaced locations on the earth and these signals transmitted for a considerable distance to a recording system. There are many applications of this type of signal system, such as underwater signaling applications, anti-submarine detection systems, nuclear reactor systems, vibration systems, etc. However, one of the most ideal applications of this system is in the collection of geophysical seismic data. Here many widely spaced detector channels are provided which are at some considerable distance from a recording unit housed in a truck. Since all of the cabling is portable it is important that a minimum number of cable conductors be utilized even for a great number of independent recording channels.

In the seismic system, as is well-known, an elastic wave signal is generated in the earth by some means, such as an electrohydraulic vibrator. The elastic wave signal is transmitted throughout the subsurface, and part of it is reflected at one or more geologic interfaces, the reflected energy being returned to the surface, where it can be detected by a plurality of spaced detectors or geophones, placed on the surface of the earth. It is this plurality of detected signals that must be collected, transmitted and stored, and it is the objective of this invention to provide such a means.

Referring now to the drawings and in particular to FIG. 1, there is shown in schematic form a diagram of the operating system of this invention. The array terminal portion is indicated generally by the numeral 112, the geophone cable portion by the numeral 114 and the geophone portion by numeral 110. There are a plurality of geophones 116 each connected by a pair of conductors 122, in a separate circuit, or separate channel, into a parallel to serial convertor 132. There may be any desired number of traces M, which are connected into the convertor, for example, 16.

Referring to FIG. 2, there are shown a plurality of array terminals 132A, 132B, etc. each connected in series with each other, and to a control means 144 (in a recording truck, not shown) by means of cables 140A, 140B, 140C, etc. They are also connected to a storage means 146 (in a recording truck) by means of cables 142A, 142B, 142C, etc.

The recorder unit 146 is a digital data storage means comprising a magnetic disc. Associated with the disc is a central control, or array controller 144, which can be programmed to carry out a number of operations on the recording channels. The control 144 operates through a multiple conductor cable 140 connected in series to each of the parallel to serial convertors 132. This comprises a two conductor cable 142 for data, and a plurality of conductors 140 for control purposes.

The control means 144 and the storage means 146 are fully described in U.S. Pat. No. 3,882,725.

In general operation, (FIG. 1) the geophone 116 is connected by two conductors 117 to a preamplifier 120. This increases the amplitude of the signal, and has a low output impedance to drive the cable 12 in current mode, whereby to minimize the noise pickup in the cable 122. The cable 122 connects to an electro-optic coupling 126, which passes on the analog variations of the signal on the cable, but without metallic contact, to a differential amplifier 128. This is a high gain, fixed gain amplifier with isolated inputs, so that it is sensitive only to the absolute difference in potential between the two conductors leading from the geophone through the cable and through the electro-optic coupling.

The output of the differential amplifier 128 is in square wave form and goes by way of leads 130 to a gate 134 and to one of a plurality of parallel inputs 136A, 136B, 136C, etc. of a parallel to serial convertor 132. All of the gates 134A, 134B, etc. have one enabling input connected to lead 138.

The output on lead 130 from high gain amplifier 128 is a square wave signal, having the precisely same axis crossing points as the analog geophone signal. All of this will be further described in connection with FIG. 6. All of the square wave signals are applied in parallel to the inputs of the convertor (or register) 132. At each digitizing interval a sharp positive signal pulse is placed on lead 138. This enables all of the gates 134. These then connect each of the amplifiers 128 to the convertor storage elements. If, at the instant that the gates are enabled, the square wave is positive, a logical 1 will be entered into the convertor storage. If the square wave is negative a logical 0 is entered. In this manner, by sampling the signals on leads 130, the signals are digitized to 1 bit and loaded into register 132. Later, on a second signal, the plurality of bits in storage in the convertor 132 are read out in series and placed on the data lines 142 as a train of single bit signals.

At each digitizing interval the control 144 will call for a serial read out of the signals stored in the parallel to serial convertor 146. This will, in effect, be a multiplexed signal giving the 1 bit digitized values of each of the channels at the instant of the sample command. On the read out command, called the interrogration command, the serial bits from convertor 132 are read out onto the conductors 142 to the storage 146.

Immediately thereafter the bits stored in parallel to serial convertor 132B, in a second array terminal, are read out and recorded in the storage 146, and so on to the last convertor in the last array terminal. Thus a complete serial read out of the bits corresponding to each of the M traces in each of the N parallel to serial convertors can be read out in sequence and stored in storage 146.

In the copending applications, Ser. No. 358,077 of which this is a continuation-in-part, it was pointed out that in adding single bit signals it is important to have a random noise with the signals, in order to provide on summation, a reconstruction of the true amplitude of the original wave form. In that application, means were provided for adding a random noise which was produced by a noise generator, which has a particular statistical nature, which can be represented as shown in FIG. 5, which is a copy of FIGS. 2 and 4 of Ser. No. 358,077. In the upper figure, the ordinate represents noise amplitude, while the abscissa represents the probability P axis. The amplitudes range from --AN to +AN. The probability that all frequency components in the noise will have the same amplitude is given by the line PUD.

When the signal is free of noise, and noise must be added, the signal is added to the noise and the amplitudes are all shifted up or down depending on the instantaneous amplitude and polarity of the signal, AS. Thus, the noise character is modified to show larger negative amplitudes (shown by the shaded area 51) and smaller positive amplitudes (shown by shaded area 53) when the signal is negative. It will show larger positive amplitudes and smaller negative amplitudes when the signal amplitude is positive. By this means, the amplitude character of the geophone signal is stored in the sum signal, even though the sum signal, when placed on the cable 142 to the storage 146 is digitized to 1 bit.

Referring now to the lower part of FIG. 5, there is shown a probability diagram in which the ordinate is amplitude, and the abscissa again is probability. This is the diagram of a Gaussian noise. This noise, as represented by PG, is a bell-shaped characteristic, where the amplitude of Gaussian noise is represented as +ANG or -ANG. This noise has a different statistical characteristic from that described in the upper part of FIG. 5, where the noise is represented by PUD, which means that the amplitudes for all frequency components are uniformly distributed.

Although not shown in FIG. 5, the addition of an analog signal to this Gaussian noise would shift the amplitudes into an unsymmetrical bell-shaped characteristic so that there would be a greater preponderance of large negative amplitudes if the signal is negative and vice versa. However, the linearity of the characteristic PUD is much to be desired.

As mentioned above, we have discovered that in all the geological areas tested, particularly when low energy sources are used as the source of the seismic waves, there is always more than sufficient random noise already premixed with the geophone signal, so that it is no longer necessary to add noise in order to obtain the benefits of one bit digitizing and summation, in order to recover original signal amplitude.

In the description to be carried out in connection with FIG. 6, it will be shown that the amplitude of the noise in comparison with the amplitude of the signal is important. In any case, the noise must be greater than the signal, in order to preserve the amplitude characteristic of the signal. For the kind of uniformly distributed noise shown in FIG. 5 the noise amplitude needs to be only slightly greater than the signal amplitude. It can be much greater, except that it is desirable in any signal system to have a minimum of noise. Thus, it is desirable to add no noise whenever the entrained noise in the geophone signal is of the order of say 1.5 times the signal or greater. The optimum range of noise amplitude to signal amplitude, or N/S ratio would be in the range of 1.1 to 1.5 or more, but generally in the range of 1.1 to 2.0.

Referring now to FIG. 6, there will be given an explanation of the operation of this system. Consider first line A1 at the top of FIG. 6. Here is shown a trace with a high frequency noise portion 62A, and the signal portion of lower frequency 64A. Noise 62A has as much energy above, as below, the axis 60A. That is, its long time average amplitude will be zero.

In line A2 is shown a similar type of trace, which would have a similar signal 64B added to a new and different noise 62B at the time the second repetition of the source is taken. Line AM represents the Mth repetition of the source, of the same channel. The noise and geophone signals are shown as 62M and 64M respectively.

It will be clear that if the combined signals, that is, the sum signals, for successive source repetitions, such as A1, 2A . . . AM are added, the noise being of the character of FIG. 5, the noise components will tend to be decreased in amplitude in accordance with the square root of the number of repetitions. The signal components will tend to add up proportionately to the number of repetitions, so there will be an improvement of signal to noise ratio by the simple process of adding or compositing these noisy traces.

Unfortunately, it is not possible to composite these analog traces at the geophone, because there is no suitable way in which they can be stored as analog signals, to be progressively added to each other. Consequently, these signals must be converted, or coded, in some way so that they can be transmitted by a single pair of conductors to the recording unit and to the storage device.

In FIG. 6, line B represents, to a larger scale, a portion of one of the geophone signals which includes signal plus noise, in which the 68 represents the noise, 70 represents the geophone signal, and 66 is the zero axis of the noise itself. Line B is the type of signal that appears on the cable leads 122.

After passing through the comparator 128 the signal looks like line B' of FIG. 6, which is a square wave having the axis crossing points 74A, 76A, 74B, 76B, 74C, 76C, etc. Line D shows the times of digitization, or the times that the gates 134 are enabled and the signals sampled. The line C illustrates the digital values entered into the convertor 132 at the sampling times 82, separated by digitizing intervals 84. Whenever the square wave 81 is zero (or negative) at times 82, it is represented by a zero value 80. In other words, whenever the trace 81 of line B' is sampled and is positive, a positive pulse, or logical 1, such as 74A' will be produced. When the trace is negative, no pulse will be produced and a logical 0 is entered.

It is to be noted that when signal 70 (line B) is positive, the number of positive pulses are fewer than the number of zero spaces (corresponding to negative pulses). The sum of the time intervals between axis crossings 74A to 76A between curves 68 and 70, will be less than the time between axis crossings 72A to 78A between curves 68 and 66. These differences are due to the amplitude of signal 70, and are the means by which the amplitude information in 70 is statistically locked by the noise into the digital signals. This shifting of the axis crossing time is a function of the amplitude of the noise and the amplitude of the signal, and stores that signal amplitude for latter recovery.

In order to multiplex a plurality of signals such as trace C on to the conductors 142, it is necessary to use a clock to provide a digitizing interval. This is represented by the trace D where the times 82 are separated by digitizing intervals 84.

Assume that lines E1, E2, EM represent a group of channels 1, 2 ... M in one array terminal (like B'). In the first digitizing interval the traces are sampled along time line 88, for example, and stored in convertor 16. On command to read out, there will be a train of bits 0, 0 . . . 0. At the next digitizing interval represented by time line 89, the stored and read out bits would be 0, 1 . . . 0. For the next interval 1, 0 . . . 1, and so on. These sets of bits represent the multiplexing of the M channels each digitizing interval.

Returning now to FIG. 1 there is shown a box number 118 which is called a seismic line amplifier (SLA). Such boxes are now in common usage as a means for raising the signal level directly at the output terminal of the geophone. The purpose of this is to increase the signal to as large an amplitude as possible so that any noise that is picked up or generated in the cable system will be less prominent with respect to the signal. In other words, there will be a better signal to noise ratio.

As explained above, since some random noise is required by this system of digitizing and summing, the amount of amplification in the SLA 118 is a function of the signal to noise ratio at the output terminals of the geophone. In general, particularly with a low energy source, the signal to noise ratio is so poor at the geophone output, that it becomes important to minimize any additional noise which may be generated in the cable conductors 122.

It is particularly important that the noise generated in conductors 122 be free of common mode noise, that is, noise which travels in the same direction in the two conductors. A low impedance drive on the cable conductors is used to minimize the noise pickup. Also as will be described in FIGS. 3 and 4 to the design of the amplifier 128 and the use of the optical coupling 126 further minimize the pickup of common mode noise into the critical parts of the digitizing system.

Referring now to FIG. 3, there is shown in greater detail the portion of FIG. 1 labeled 110 and 114. There are shown a plurality of geophones such as 116A, 116B, 116C, etc. connected in series, and each having a resistor 150 of selected magnitude to provide a selected damping characteristic of the geophone. A preamplifier 152 is provided at the geophone in order to couple the high output impedance of the geophone to the low impedance of the cable conductors 170, which are driven in a current mode and therefore are less susceptible to noise pickup. The amplifier 152 is a conventional differential amplifier with two inputs 154 and 156 connected directly to the series outputs of the geophones 116. There is feedback, including resistors 166 and 160 between the output 165 of the amplifier 152, back to the midpoint of the resistors 158 and 159 connected across the lines 154 and 156.

The purpose of the amplifier 10 is to increase signal level, and at the same time convert from a voltage drive on conductors 154, 156 to a current drive on cable conductors 170, to minimize noise pickup.

Referring now to FIG. 4 the points 172 at the input to the box 177, which corresponds to the box 124 of FIG. 1, correspond to the end of the cable 170 of FIG. 3. There is in series between the terminals 172 and 176 a series battery 174 of selected voltage, nominally about 12 volts. This provides a current through the solid state device 178, which includes a light emitting diode 182. The voltage 174 is carried through the diode by leads 180 and 179 and the light which is produced by the diode 182 varies in intensity in direct proportion to the current flowing through the lines 180 and 179. This luminous energy from the diode 182 falls on a photosensitive transistor 184 and controls the potential of the base, and therefore controls the flow of current through the transistor from a source of voltage 185, which may be of the order of 8 volts, to the collector of the transistor, and from the emitter through a resistor 183 to ground 181.

There is an amplifier 186 with one input 175 biased at a preselected voltage. The other input 173 carries the potential of the emitter of the transistor 184. Consequently, the voltage on 173 varies in accordance with the light output of the LED 182. There is also a feedback from the output 187 of the amplifier 186, through resistors 179 to provide the proper characteristics, as is well-known in the art.

There is capacitive coupling 188 between the amplifier 186 and a second amplifier 190, through resistors 195 and 196. The potential at point 194 goes to one input of the amplifier 190 and the other input goes from the feedback through resistor 191 from the output 198.

The various amplifiers and other solid state devices described are conventional, off the shelf items, the characteristics of which are well-known to the man skilled in the art, and no further detail is required. Obviously this invention is workable to greater or less perfection with other types of detailed circuitry. What is shown is by way of example only and is not to be limiting in any respect. One of the important parts of FIG. 4 is the optical coupler 178, which transmits the analog signal on leads 172 to the amplifiers 186 and 190. The output on lead 198 corresponds to the output on lead 130 of FIG. 1 and its handling thereafter has been explained in connection with FIG. 1.

This information acquisition and transmission system is ideally suited for gathering time function information from a plurality of distributed locations, processing these into the form of 1 bit digitized signals that can be multiplexed from the entire plurality of separate channels onto a two conductor cable into the storage device. The description of this information system as a seismic system is purely coincidental and there is no limitation to the use of this system intended by its description in this manner.

Furthermore, this particular data acquisition system is intended to be used in conjunction with a plurality of array terminals and a means for controlling the data handling operations and the compositing of successive records and so on. The additional equipment and methods involved in these additional operations are described and claimed in three copending patent applications described above. These three additional applications are introduced into and made part of this application by reference and this reference material is intended to supplement the description provided in this specification.

While separate two conductor cables 122, FIG. 1 are shown from each geophone 116, or geophone group 116A, 116B, 116C, etc. it is possible to transmit such signals over common conductors, or other means as is well-known in the art. Therefore, this invention is not limited to such individual conductors.

While the invention has been described with a certain degree of particularly it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In a seismic prospecting system in which a series of sequential elastic wave signals are impressed on the earth and detected at a plurality of spaced geophones as a plurality of separate received signals, after being transmitted through the earth, the improvement in method of acquisition, transport and storage of said signals comprising:
   a. in an array terminal (AT) amplifying each of the plurality of separate received signals at constat gain to obtain a plurality of separate amplified analog signals;
   b. at first selected equally spaced digitizing times simultaneously sampling each of said plurality of amplified analog signals and producing a plurality of discrete single bit digital signals, temporarily storing said plurality of single bit digital signals in a register means; and
   c. at second selected intervals of time, reading out in series, said temporarily stored plurality of single bit digital signals and transmitting them in series to a distant storage means over a two conductor cable means as a train of discrete single bit digital signals.

2. The method as in claim 1 in which said step of storing said single bit digital signals comprises storing in parallel in a parallel to serial converter means.

3. The method as in claim 1 in which said step of amplification of said signals comprises amplifying at constant gain.

4. The method as in claim 1 in which said steps of digitizing and producing comprises the steps of:
   a. at said first selected equally spaced digitizing times sampling each of said plurality of amplified analog signals to produce a plurality of discrete samples; and
   b. determining the signs of each of said discrete samples.

5. The method as in claim 2 in which said steps of digitizing and producing comprise;
   a. applying each of said plurality of amplified analog signals to one of the parallel inputs of a parallel-to-serial converter means through separate gate means; and
   b. at said equally spaced digitizing times momentarily opening all of said gate means;
   whereby a discrete logical 1 or logical 0 will be stored in said converter means for each of said plurality of samples depending on whether the instantaneous polarity of each of said analog signals is positive or negative.

6. The method as in claim 5 in which each of said amplified analog signals comprises a square wave signal.

7. The method as in claim 1 in which said analog signals include random noise.

8. The method as in claim 7 in which said random noise has an amplitude at least equal to that of said signal.

9. A system for generating electrical analog signals, amplifying, sampling and digitizing them to 1 bit, and transporting the 1 bit digital signals, comprising;
   a. a plurality of sensors each detecting at least one physical parameter and generating a plurality of analog electrical signals, indicative of said parameter at each of said sensors;
   b. means to amplify at constant gain each of said plurality of analog signals;
   c. means at first selected equally spaced digitizing times to sample and to digitize to 1 bit each of said plurality of amplified analog signals to form a plurality of separate discrete 1 bit pulses indicative of the instantaneous polarity of each of said plurality of amplified analog signals;
   d. means to temporarily store said plurality of separate discrete 1 bit pulses; and
   e. means at second selected intervals of time to transmit said temporarily stored plurality of 1 bit pulses as a train of discrete 1 bit digital signals over a two conductor line to a distant storage means.

10. The system as in claim 9 in which the sensors are geophones.

11. The system as in claim 9 in which said analog signal includes random noise.

12. The system as in claim 11 in which said random noise is greater in amplitude than said analog signal.

13. The system as in claim 12 in which the amplitude of the random noise is greater than 3 times the analog signal.

14. The system as in claim 10 including two conductor cable means connecting said geophones to said means to amplify and including means to preamplify said geophone signal before it is applied to said cable means.

15. The system as in claim 14 in which said means to preamply includes means to drive said cable means on a current basis, whereby said cable means will be low impedance, and the pickup of noise in said cable means will be minimized.

16. The system as in claim 15 including means to optically couple the signal at the output end of said cable means, to said means to amplify.

17. The system as in claim 10 in which said means to amplify includes means to convert said signal to a square wave signal.

18. The system as in claim 9 in which said means to amplify, said means to sample and digitize, and said means to temporarily store are contained in a first array terminal, and including at least a second array terminal; and including means to transmit said stored 1 bit pulses as a train of discrete 1 bit digital signals from said first array terminal to said second array terminal, and from said second array terminal to said storage means, over a single pair of conductors.

19. The system as in claim 9 in which said means to digitize each of said plurality of amplified analog signals comprises;

a. means to simultaneously apply each of said amplified analog signals to the input of a separate digital storage means through a separate gate means; and
   b. means to simultaneously momentarily open each of said gate means at said digitizing times;
   whereby a logical 1 or logical 0 will be stored in each of said separate digital storage means depending on the instantaneous polarity of each of said analog signals at said digitizing times.

20. A data gathering and transporting system comprising:

a. a plurality of N array terminals;
   b. each array terminal having a plurality of M conductor means each connected to at least one geophone so that said geophones can be positioned in selected spaced relation, to sense at least one physical parameter of the earth, and to produce an analog signal indicative of said parameter;
   c. each array terminal having an input port and an output port, into each of which a multiple conductor cable is connected, said multiple conductors comprising signal and control conductors;
   d. means, including a plurality of selected lengths of said cable to connect said array terminals in series connection and to connect the last in series of said terminals to array control and storage means;
   e. means in said array control means to signal all of said terminals, by a coded signal at selected equally spaced digitizing times on said control conductors;
   f. a plurality of M means in each array terminal, each one in circuit with one of said geophones to amplify at constant gain and simultaneously to sample and digitize to discrete 1 bit digital signals said analog signals, and to store said discrete 1 bit digitized signals in said array terminal; and
   g. means on command from said array control means to readout and transmit each of said discrete 1 bit digitized signals stored in said array terminals, to the next in series array terminal and to said storage means.

* * * * *